United States Patent
Maracas et al.

(10) Patent No.: US 8,676,245 B2
(45) Date of Patent: Mar. 18, 2014

(54) SYSTEM AND METHOD FOR CONTROLLING THE TRANSMISSION POWER OF A NODE

(75) Inventors: George N. Maracas, Phoenix, AZ (US); Charles B. Swope, Coral Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1076 days.

(21) Appl. No.: 11/694,876

(22) Filed: Mar. 30, 2007

(65) Prior Publication Data

US 2008/0240025 A1   Oct. 2, 2008

(51) Int. Cl.
*H04B 7/00* (2006.01)

(52) U.S. Cl.
USPC ............ 455/522; 455/127.1; 455/67.11; 455/500; 455/343.1; 340/577; 340/581; 340/584

(58) Field of Classification Search
USPC ....... 455/522, 556.1, 67.11, 574, 343.1, 423, 455/500, 507, 508, 344, 456.1, 456.5, 455/456.6, 457, 449, 446; 340/521, 572.4, 340/628, 584, 501, 581, 531, 539.1, 539.13, 340/825.49, 593
See application file for complete search history.

(56) References Cited

U.S. PATENT DOCUMENTS

| | | | | |
|---|---|---|---|---|
| 5,951,900 | A * | 9/1999 | Smrke | 219/497 |
| 7,046,166 | B2 * | 5/2006 | Pedyash et al. | 340/870.07 |
| 7,212,105 | B2 * | 5/2007 | Okubo | 340/447 |
| 7,295,119 | B2 * | 11/2007 | Rappaport et al. | 340/572.4 |
| 7,304,976 | B2 * | 12/2007 | Mao et al. | 370/338 |
| 7,412,338 | B2 * | 8/2008 | Wynans et al. | 702/61 |
| 7,846,154 | B2 * | 12/2010 | Bliweis et al. | 606/24 |
| 8,175,016 | B1 * | 5/2012 | Basu et al. | 370/311 |
| 2002/0021231 | A1 * | 2/2002 | Schlager et al. | 340/984 |
| 2003/0050104 | A1 * | 3/2003 | Matsumura et al. | 455/574 |
| 2003/0062852 | A1 * | 4/2003 | Park et al. | 315/248 |
| 2006/0063523 | A1 * | 3/2006 | McFarland | 455/423 |
| 2006/0092042 | A1 * | 5/2006 | Davis et al. | 340/870.01 |
| 2006/0100002 | A1 * | 5/2006 | Luebke et al. | 455/574 |
| 2006/0176169 | A1 | 8/2006 | Doolin et al. | |

(Continued)

FOREIGN PATENT DOCUMENTS

| | | | |
|---|---|---|---|
| EP | WO2005043446 A2 | 5/2005 | |
| JP | 403244949 | * | 10/1991 |
| JP | 409009489 A | * | 1/1997 |

OTHER PUBLICATIONS

PCT International Search Report Application No. PCT/US2008/056464 Dated Aug. 13, 2008—11 Pages.
R. Larry Grayson: Improving Mine Safety Technology and Training: Establishing U.S. Global Leadership, Mine Safety Technology and Training Commission Dec. 5, 2006—24 Pages.
S. Panichpapiboon et al.:Optimal Transmit Power in Wireless Sensor Networks, IEEE Transactions on Mobile Computing, vol. 5, No. 10, Oct. 2006—16 Pages.
Sarah A. Summers: Wireless Sensor Networks for Firefighting and Fire Investigation, In Class of CS526 Semester Project in 2006. (http://cs.uccs.edu/~cs526/student proj/prosj2006/sasummer/doc/cs526projsummers.doc) Spring 2006—28 Pages.

*Primary Examiner* — Sujatha Sharma
(74) *Attorney, Agent, or Firm* — Barbara R. Doutre

(57) ABSTRACT

A system (10) and method (50) for controlling the transmission power of a node (14) that includes at least one base station (12), at least one node (14), a sensor (16), and a control unit (20). The node (14) is in communication with the base station (12). The sensor (16) is integrated with each of the nodes (14), wherein the sensor (16) collects data that includes at least the amount of combustible material (18) proximate to the node (14). The control unit (20) is integrated with each node (14) and configures the transmission power of each of the nodes (14) based upon the data collected by the sensor (16).

25 Claims, 4 Drawing Sheets

(56) References Cited

U.S. PATENT DOCUMENTS

| | | | |
|---|---|---|---|
| 2006/0258292 A1* | 11/2006 | Kato et al. | 455/67.11 |
| 2007/0200697 A1* | 8/2007 | Sakai et al. | 340/539.22 |
| 2007/0221125 A1* | 9/2007 | Kaushal et al. | 118/663 |
| 2008/0070614 A1* | 3/2008 | Ogushi et al. | 455/522 |
| 2008/0071899 A1* | 3/2008 | Odaka et al. | 709/223 |
| 2009/0252087 A1* | 10/2009 | Jiang et al. | 370/328 |
| 2009/0299694 A1* | 12/2009 | Frank | 702/180 |

* cited by examiner

SYSTEM AND METHOD FOR CONTROLLING THE TRANSMISSION POWER OF A NODE

FIELD OF THE INVENTION

The present invention relates generally to two-way communications systems and more particularly to a system and method for controlling transmission power based upon conditions proximate a communications node.

BACKGROUND

Wireless communication and networking has generally become more prevalent for both personal and commercial purposes. Wireless communication devices are being used for a variety of purposes in many different environments. Those skilled in the art will recognize that a wireless communications device might include a cellular telephone device, two-way radio as well as those devices used to provide a communications infrastructure and/or network. Typically, these wireless communication devices can be used for many purposes in many differing types operational environments. However, under some environmental circumstances, it may be desirable to use specialized wireless communication devices due to the operating conditions where the wireless communication devices and network devices are operating.

For example, in the mining industry, these wireless communication devices can be used in areas where the amount of gaseous and solid combustible materials in work areas can create a hazardous situation when using the communication device. Generally, the electrical power of a wireless communication device and networking device generate energy fields that can potentially couple energy into nearby machinery or tools. When nearby mechanical movement occurs or gaps in metallic structures exist, discharge of high electromagnetic potentials can result based upon the amount of power that is transmitted from the wireless communication device.

Due to the use of these wireless communication devices in potentially hazardous environments, there are typically strict industrial regulations in the use and operating parameters of these wireless communication devices. Generally, the regulations on the wireless communication devices can limit the practicality of using this communications technology in these environments. However, these types of regulations are generally necessary since most wireless communication devices do not have the ability to control the electrical power in the device based upon the environmental conditions.

Known techniques for using communication devices under certain environmental conditions include U.S. Patent Application Publication No. 2006/0176169, entitled "SYSTEM FOR SENSING ENVIRONMENTAL CONDITIONS," in which a system is defined that includes a deployed sensor system for sensing specific environmental conditions. However, this type of system controls operation of the device to the extent that it will either turn on and off based upon the environmental conditions. The system described in this application does not control radio frequency (RF) emissions based upon the environmental conditions so that the system can continue functioning in the adverse environmental conditions.

Therefore, the need exists to develop a system and method for sensing combustible material conditions in an adverse environment and configure devices in the communications system so as to enhance safety or to prevent accidental ignition of combustible materials in these environments.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
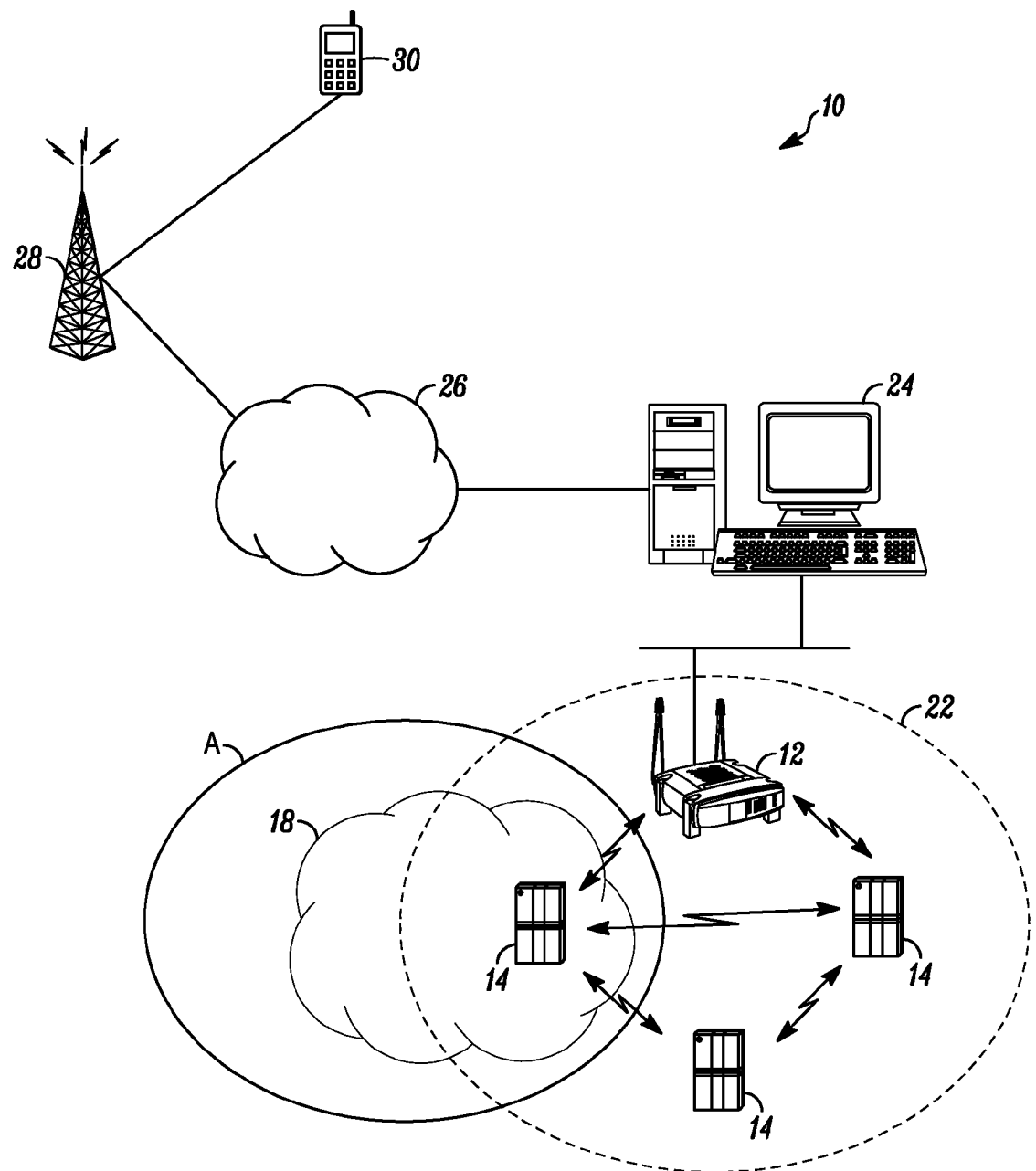
FIG. 1 is an environmental diagram of a communication system in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to controlling the transmission power of a communication system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of detecting and identifying spectrum opportunities described herein. The non-processor circuits may include, but are not limited to, a radio receiver, a radio transmitter, signal drivers, clock circuits, power source circuits, and user input devices. As such, these functions may be interpreted as steps of a method to perform the controlling of the transmission power of the communication system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

Figure 2:
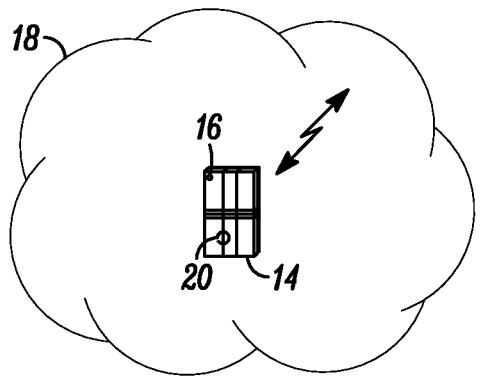
FIG. 2 is a block diagram of a node in a communication system as shown in Section A of FIG. 1 in accordance with an embodiment of the present invention.

As seen in both FIGS. 1 and 2, a communication system 10 is illustrated in accordance with an embodiment of the present invention. The system 10 includes at least one base station 12 and at least one node 14 that is in communication with the base station 12. The system 10 further includes a sensor 16 integrated with each of the nodes 14. Typically, the sensor 16 monitors the environmental conditions in predetermined intervals, and collects data that includes at least the amount of combustible material 18 proximate to the node 14. These environmental conditions can include but are not limited to such variables as temperature, pressure, relative humidity and the solid and gaseous content of the surrounding air. Thus, the sensor 16 can monitor the amount of combustible material 18 that is surrounding or near the node 14, such that the density of the combustible material is measured. Alternatively, the amount of combustible material is determined using another suitable form of measurement to determine if an undesirable amount of the combustible material is proximate the node 14. The system 10 also includes a control unit 20 integrated into each of the nodes 14 that configures the transmission power of the node 12 based upon the data collected by the sensor 16. Thus, the control unit 20 configures the transmission power of the node 14 in order to prevent ignition of the combustible material 18 in the surrounding environment.

In one embodiment, the nodes 14 are in communication with one another, such that the data collected by one node 14 is transmitted and used by at least one other node 14. The control unit 20 configures the transmission power based upon the data collected by the sensor 16 of the node 14 in addition to the data collected by the sensors 16 of other nodes 14. The nodes 14 can communicate directly with one another, or transmit the sensed data through the base station 12. Further, a first node 14 can transmit the collected data to a second node 14, which can then transmit the data to a third node 14, such that the RF transmission power of all of the nodes 14 can be configured by the control unit 20 of each node 14 based upon the transmitted data and the sensed data obtained by the sensor 16.

The base station 12 and nodes 14 can be configured as part of a MESH network 22. Those skilled in the art will recognize that a MESH network is configured so as to route data, voice and/or instructions between networked nodes, such that it allows for continuous connections and reconfiguration around broken or blocked paths by "hopping" from node to node until the destination is reached. MESH networks differ from other networking types in that the component parts can all connect to each other via multiple hops, and they generally are not mobile. Hence, the MESH network 22 is a network that allows for continuous connections and reconfigurations around nodes 14 based upon the operating characteristics of the individual nodes 14. By way of example, and not limitation, if one node 14 is configured to have a low transmission power due to the combustible material 18 proximate to the node 14 or is not functioning, then the MESH network 22 can re-route communications through other nodes 14. Thus, in the MESH network 22, all of the base stations 12 and the nodes 14 are configured to communicate with one another.

The system 10 can also include a remote database or server 24 that is in communication with the base station 12, the node 14, or a combination thereof. The remote database 24 can include additional data for configuring the transmission power of the node 14 or other suitable data or devices for controlling the system 10. The remote database 24 can be connected to additional networks 26, such as, but not limited to, the Internet, in order to communicate with other devices, obtain additional data for configuring nodes 14, the like, and/or a combination thereof. By way of explanation and not limitation, the remote database 24 can be connected to a radio network transponder 28 for communication with a remote radio device 30. Thus, the base station 12 and/or the node 14 can be in communication with the remote radio device 30 that is remote from the MESH network 22.

In an alternate embodiment, the node 14 can be integrated in a two-way radio transceiver that is used for communication in the MESH network 22. The sensor 16 monitors the amount of combustible material 18 surrounding the radio, such that the control unit 20 configures the transmission power of the node 14, and thus, the transmission power of the radio. As described in greater detail herein, a user of the radio that has an integrated node 14 can move and the sensor 16 will continuously monitor the environment proximate to the node 14, and thus, the radio. Typically, the sensor 16 monitors the environmental conditions in predetermined intervals, such that the node 14 and the radio will transmit at acceptable transmission power levels based upon the environmental conditions.

Typically, the combustible material 18 monitored by the sensor 16 is a combustible gaseous material, a combustible dust material, the like, or a combination thereof. The control unit 20 configures the transmission power of the node 14 to a level that enhances safety and reduces the possibility of igniting or ignition of the combustible material 18. Generally, there are flashpoint values for combustible materials 18 that are proportional to the amount and type of the combustible material 18 in the area being sensed by the sensor 16. The flashpoint values for predetermined combustible materials 18 can be stored in the node 14 or transmitted to the node 14 by the base station 12, the remote database 24, or a combination thereof. According to one embodiment, the control unit 20 can configure the transmission power based upon the sensed amount of combustible material 18 proximate the node 14, data received from other nodes 14, the flashpoint data, other desirable data for configuring the transmission power, or a combination thereof.

Figure 3:
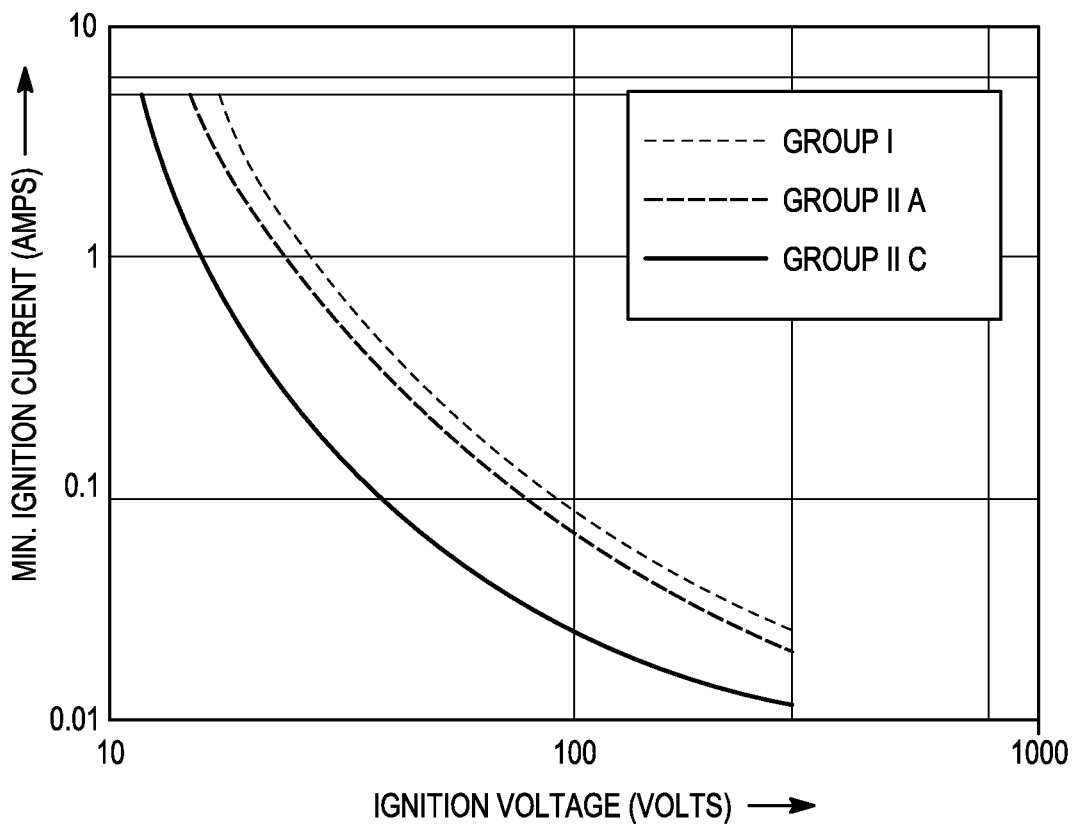
FIG. 3 is a chart depicting the relationship between the minimum ignition current and the ignition voltage of exemplarily combustible materials.

FIG. 3 illustrates a chart depicting the relationship between the minimum ignition current and the ignition voltage of exemplarily combustible materials 18. The exemplarily combustible materials 18 are methane (Group I), propane (Group IIA), and acetylene (Group IIC). Generally, as the minimum ignition current, which is measured in amperes (Amps), increases, the required ignition voltage of the combustible material 18 decreases. Similarly, as the ignition voltage increases, the minimum ignition current for igniting the combustible material 18 decreases. Thus, the minimum ignition current and the ignition voltage are inversely proportional, and the control unit 20 can configure the RF transmission power accordingly.

Figure 4:
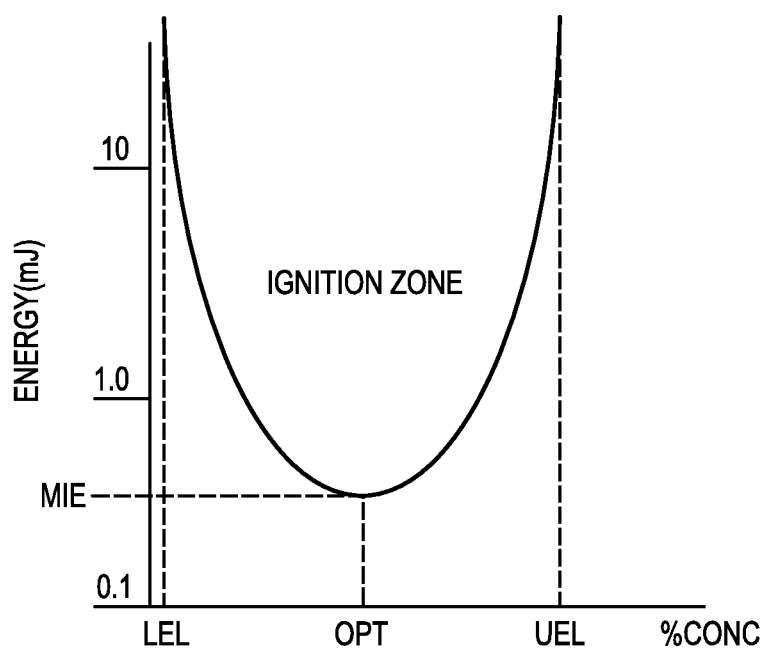
FIG. 4 is a chart depicting an exemplarily curve for ignition of a combustible material with respect to the transmission power and the amount of combustible material.

FIG. 4 is a chart depicting an exemplarily curve for ignition of a combustible material with respect to the transmission power and the amount of combustible material. By way of explanation and not limitation, as the combustion measure or amount of the exemplarily combustible materials 18 increase, the transmission power setting or level of the node 14 decreases. The transmission power in FIG. 3, which is a function of the geometry of the node 14 and the surrounding environment, is represented by the transmission power curve depicted in FIG. 4. Likewise, as the combustion measure or amount of the exemplarily combustible materials 18 decrease, the node 14 can be configured by the control unit 20 to increase the transmission power of the node 14. The configured transmission power setting of the node 14 is based upon the ignition values shown in FIGS. 3 and 4.

Generally, the exemplarily combustible materials 18 of Group I have a minimum ignition energy (MIE) of approximately 0.26 micro Joules (mJ), a lower explosive level (LEL) of approximately 5%, an upper explosive level (UEL) of approximately 15%, and an optimum (Opt.) or ripe point, which can cause the combustible material 18 to ignite, of approximately 9.5%. The exemplarily combustible materials 18 of Group IIA have an MIE of approximately 0.25 mJ, an LEL of approximately 2.1%, a UEL of approximately 9.5%, and an Opt. of approximately 5.8%. The exemplarily combustible materials 18 of Group IIC have an LEL of approximately 2.5%, a UEL of approximately 100%, and an Opt. of approximately 50%. Those skilled in the art will recognize that the general curve defining the ignition zone is approximately the same for different combustible materials 18, where the MIE, LEL, UEL, and Opt. will vary for different combustible materials 18, based upon other factors, such as but not limited to, the types of combustible materials, the environmental conditions, and the node 14 geometry. Thus, as the amount of combustible material 18 changes, the transmission power of the node 14 is also changed.

Figure 5:
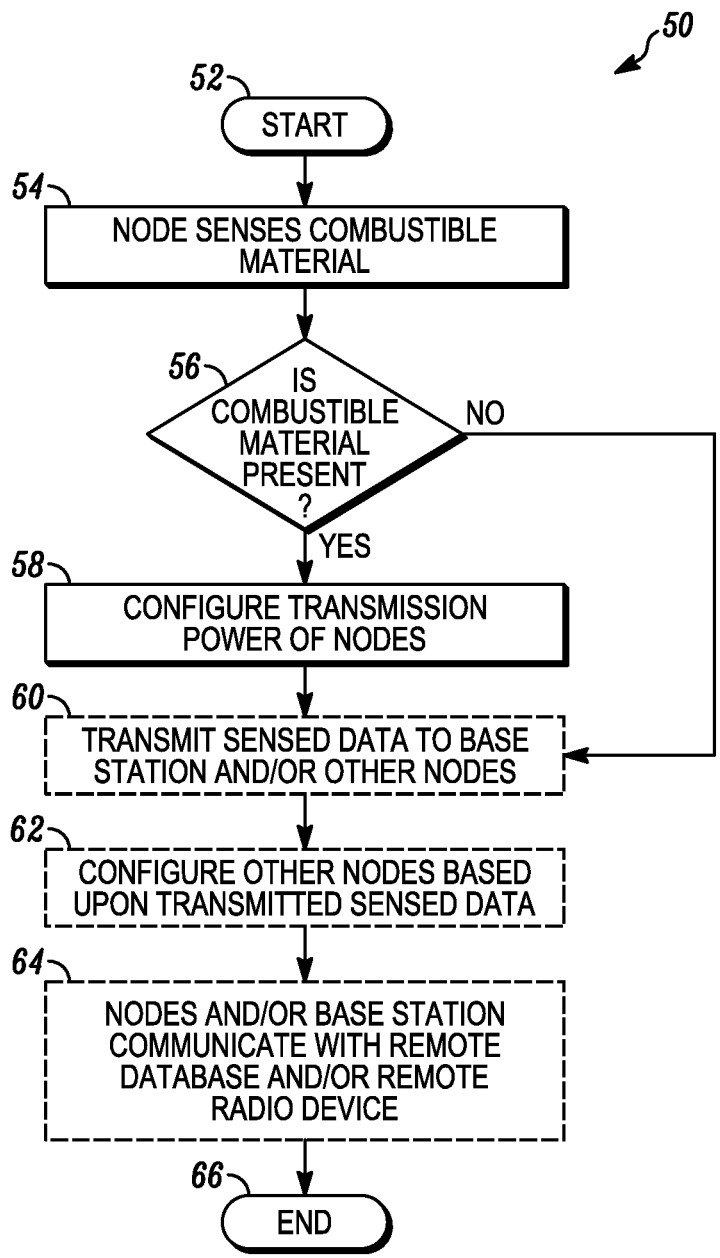
FIG. 5 is a flow diagram of a method of controlling the transmission power of a node in a communication system in accordance with another embodiment of the present invention.

In reference to both FIGS. 1 and 5, a method 50 for controlling the transmission power in the communication system 10 includes starting the process 52 and then sensing 54 the combustible material 18 by the node 14. Typically, the sensor 16 is used to sense the amount of combustible material 18. It is then determined if any combustible materials 18 are present or proximate 56 the node 14.

If it is determined that there are combustible materials 18 present 56, then the transmission power of the node 14 is configured 58. Typically, the control unit 20 configures the transmission power based upon the amount of combustible material 18 that is present.

Alternatively, the sensed data is transmitted 60 to the base station 12 and/or other nodes 14 (as shown in phantom). However, if there are no combustible materials 18 present 56, then after the sensed data is transmitted 60, other nodes 14 can be configured based upon the transmitted sensed data 62. The other nodes 14 are also configured based upon the sensed data obtained by the integrated sensor 16 in combination with the transmitted sensed data. The process then continues where the nodes 14 and/or base station 12 communicate 64 with the remote database 24 and/or the remote radio device 30, and then ends 66.

By way of explanation and not limitation, the system 10 and method 50 can be used in areas where combustible materials 18 are present, such as a coal mine, grain silos, or the like. Thus, the nodes 14 can be placed along the inside of the coal mine and additional nodes 14 can be placed in the mine as the mine gets deeper. Additionally, the node 14 can be integrated with a radio that is used by a person inside the mine. As the nodes 14 are communicating with one another in the mine, the nodes 14 are sensing the area for combustible material 18 in predetermined time intervals. As the amount of combustible material 18 proximate the node 14 is altered, the control unit 20 configures the transmission power of the node 14 to an acceptable level. Thus, the nodes 14 continue to communicate, and thus, are not turned-off based upon the presence of the combustible material 18, but continue transmitting at power levels that enhance safety and reduce the possibility of igniting or combustion of the combustible material 18. Further, the nodes 14 can communicate with one another as part of the MESH network 22, such that the control unit 20 can configure the transmission power based upon the sensed combustible material 18 proximate the node 14 and the data obtained by other nodes 14. Additionally, the control unit 20 can configure the transmission power based upon data received from the remote database 24.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A communication system comprising:
    a sensor integrated with each of a plurality of wireless communication nodes, wherein the sensor collects data that includes at least the amount of combustible material proximate to the at least one wireless communication node of the plurality of wireless communication node;
    a control unit integrated with each of the plurality of wireless communication nodes, wherein the control unit configures the transmission power of the at least one wireless communication node based upon the data collected by the sensor; and
    a transceiver integrated with each of the plurality of wireless communication nodes for communicating using the configured transmission power.

2. The system of claim 1, wherein the control unit configures the transmission power to prevent ignition of the combustible material.

3. The system of claim 1, wherein the control unit configures the transmission power of a first wireless communication node of the plurality of wireless communication nodes based upon the data collected by the sensor of at least one other wireless communication node, such that the wireless communication nodes are in communication with one another.

4. The system of claim 3, wherein the first wireless communication node communicates the data collected by the sensor directly with the at least one other wireless communication node so that the first wireless communication node and the at least one other wireless communication node form a MESH network.

5. The system of claim 3, wherein the first wireless communication node communicates the data collected by the sensor to at least one base station and the at least one base station transmits the data to the at least one other wireless communication node.

6. The system of claim 1, wherein a first wireless communication node of the at least one wireless communication node is integrated into a radio device, and the radio device is in communication with at least one base station and a second wireless communication node of the at least one wireless communication node.

7. The system of claim 1 further comprising at least one remote radio device in communication with a base station.

8. The system of claim 1 further comprising at least one remote database in communication with at least one base station and the at least one wireless communication node.

9. A communication system comprising;
at least one base station;
a plurality of wireless communication nodes in communication with the at least one base station;
a sensor integrated with each of the plurality of wireless communication nodes, wherein the sensor collects data that includes at least the amount of combustible material proximate to the each of the plurality of wireless communication nodes;
a control unit integrated with each of the plurality of wireless communication nodes, wherein the control unit configures the transmission power of each of the plurality of wireless communication nodes based upon at least one of the data collected by the sensor and the data collected by sensors of other wireless communication nodes in order to prevent ignition of the combustible materials; and
a transceiver integrated with each of the plurality of wireless communication nodes for communicating using the configured transmission power.

10. The system of claim 9, wherein a first wireless communication node of the plurality of wireless communication nodes communicates the data collected by the sensor directly with at least one other wireless communication node of the plurality of wireless communication nodes so that the first wireless communication node and the at least one other wireless communication node form a MESH network.

11. The system of claim 9, wherein a first wireless communication node of the plurality of wireless communication nodes communicates the data collected by the sensor to the at least one base station, and the at least one base station transmits the data to at least one other wireless communication node of the plurality of wireless communication nodes.

12. The system of claim 9, wherein a first wireless communication node of the plurality of wireless communication nodes is integrated into a radio device, and the radio device is in communication with at least one of the at least one base station and a second wireless communication node of the plurality of wireless communication nodes.

13. The system of claim 9 further comprising at least one remote radio device in communication with the at least one base station.

14. The system of claim 9 further comprising at least one remote database in communication with at least one of the at least one base station and the plurality of wireless communication nodes.

15. A method of controlling transmission power in a transmitting device, the method comprising the steps of:
providing at least one base station in communication with at least one wireless communication node;
monitoring the amount of combustible material proximate each of the at least one wireless communication nodes;
configuring the transmission power of each of the at least one wireless communication node based upon the amount of combustible material proximate the at least one wireless communication node; and
communicating, by each of the at least one wireless communication node, using the configured transmission power.

16. The method of claim 15 further comprising the step of communicating between a remote database and at least one of the at least one base station and the at least one wireless communication node.

17. The method of claim 15 further comprising the step of communicating between a remote radio device and the at least one base station.

18. The method of claim 15, wherein at least one wireless communication node is integrated into a two-way radio transceiver.

19. The method of claim 15 further comprising the step of forming a MESH network with the at least one wireless communication node and the at least one base station, such that a first wireless communication node of the at least one node communicates the data collected by the sensor with at least one other wireless communication node of the at least one wireless communication node.

20. The method of claim 15 further comprising the step of communicating the data collected by the sensor from a first wireless communication node of the at least one wireless communication node to the at least one base station, and transmitting the data from the at least one base station to at least one other wireless communication node of the at least one wireless communication node.

21. The system of claim 3, wherein in response to the amount of combustible material proximate the wireless communication node being altered, the control unit of each wireless communication node configures the wireless communication node transmission power to an acceptable level, and the wireless communication nodes continue to communicate at power levels that reduce the possibility of igniting or combustion of the combustible material.

22. The system of claim 15, wherein a control unit is integrated with each of the at least one wireless communication nodes, and the control unit configures the transmission power of each of the at least one wireless communication node to a level that reduces the possibility of igniting or ignition of the combustible material.

23. The system of claim 1, wherein the transceiver communicates at one of at least two transmission power levels based on the configured transmission power, and further wherein each of the transmission power level correspond to a flashpoint value of the amount of combustible material proximate to the at least one wireless communication node.

24. The system of claim 9, wherein the transceiver communicates at one of at least two transmission power levels based on the configured transmission power, and further wherein each of the transmission power level correspond to a flashpoint value of the amount of combustible material proximate to each of the plurality of wireless communication nodes.

25. The method of claim 15, wherein the communicating step further comprises:
communicating at one of at least two transmission power levels based on the configured transmission power, and further wherein each of the transmission power level correspond to a flashpoint value of the amount of combustible material proximate to each of the at least one wireless communication node.

* * * * *

UNITED STATES PATENT AND TRADEMARK OFFICE
CERTIFICATE OF CORRECTION

| | | |
|---|---|---|
| PATENT NO. | : 8,676,245 B2 | Page 1 of 1 |
| APPLICATION NO. | : 11/694876 | |
| DATED | : March 18, 2014 | |
| INVENTOR(S) | : Maracas et al. | |

It is certified that error appears in the above-identified patent and that said Letters Patent is hereby corrected as shown below:

On the title page item 56, under "OTHER PUBLICATIONS", in Column 2, Line 11, delete "proj/prosj2006/sasummer/doc/" and insert -- proj/projs2006/sasummer/doc/ --, therefor.

In the specification

In Column 3, Line 44, delete "node 12" and insert -- node 14 --, therefor.

In the claims

In Column 7, Line 12, in Claim 9, delete "comprising;" and insert -- comprising: --, therefor.

In Column 8, Line 36, in Claim 22, delete "The system" and insert -- The method --, therefor.

Signed and Sealed this
Third Day of May, 2016

Michelle K. Lee
*Director of the United States Patent and Trademark Office*